United States Patent
Toichi

(10) Patent No.: US 10,162,795 B2
(45) Date of Patent: Dec. 25, 2018

(54) PROCESSOR FOR CHANGING WEIGHT OF COSTS NEEDED IN RECONFIGURABLE CIRCUIT

(71) Applicant: FUJITSU LIMITED, Kawasaki-shi, Kanagawa (JP)

(72) Inventor: Masahiko Toichi, Urayasu (JP)

(73) Assignee: FUJITSU LIMITED, Kawasaki (JP)

( * ) Notice: Subject to any disclaimer, the term of this patent is extended or adjusted under 35 U.S.C. 154(b) by 79 days.

(21) Appl. No.: 15/290,071

(22) Filed: Oct. 11, 2016

(65) Prior Publication Data
US 2017/0185564 A1    Jun. 29, 2017

(30) Foreign Application Priority Data
Dec. 24, 2015 (JP) ................. 2015-251934

(51) Int. Cl.
*G06F 9/46* (2006.01)
*G06F 15/78* (2006.01)
*G06F 9/48* (2006.01)

(52) U.S. Cl.
CPC .......... *G06F 15/7875* (2013.01); *G06F 9/485* (2013.01); *G06F 9/4881* (2013.01); *G06F 15/7871* (2013.01)

(58) Field of Classification Search
None
See application file for complete search history.

(56) References Cited

U.S. PATENT DOCUMENTS

| | | | |
|---|---|---|---|
| 8,745,626 B1 * | 6/2014 | Sandstrom | G06F 9/5027 709/226 |
| 2001/0010074 A1 * | 7/2001 | Nishihara | G06F 9/325 712/227 |
| 2007/0150718 A1 | 6/2007 | Toi et al. | |
| 2008/0201713 A1 * | 8/2008 | Chaffee | G06Q 10/06 718/103 |
| 2013/0268937 A1 * | 10/2013 | Woo | G06F 9/4881 718/102 |

FOREIGN PATENT DOCUMENTS

| | | |
|---|---|---|
| JP | 2007-179358 | 7/2007 |
| JP | 2009-129163 | 6/2009 |

* cited by examiner

*Primary Examiner* — Gregory A Kessler
(74) *Attorney, Agent, or Firm* — Fujitsu Patent Center

(57) ABSTRACT

A processor controls a reconfigurable circuit capable of dynamically reconfiguring a circuit which achieves a task of a computer, the processor executes a process having determining, when reconfiguring each of circuits which achieve a plurality of tasks in the reconfigurable circuit, assigned times of time sharing of the plurality of tasks or priority processing ranks of the plurality of tasks based on costs needed in the reconfigurable circuit for respective circuits which achieve the plurality of tasks.

3 Claims, 8 Drawing Sheets

F I G. 1A
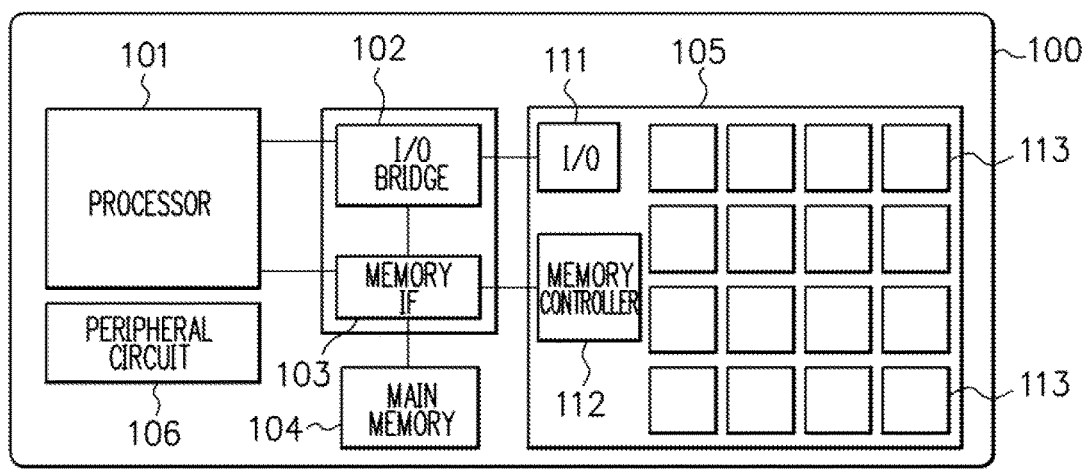
F I G. 1B
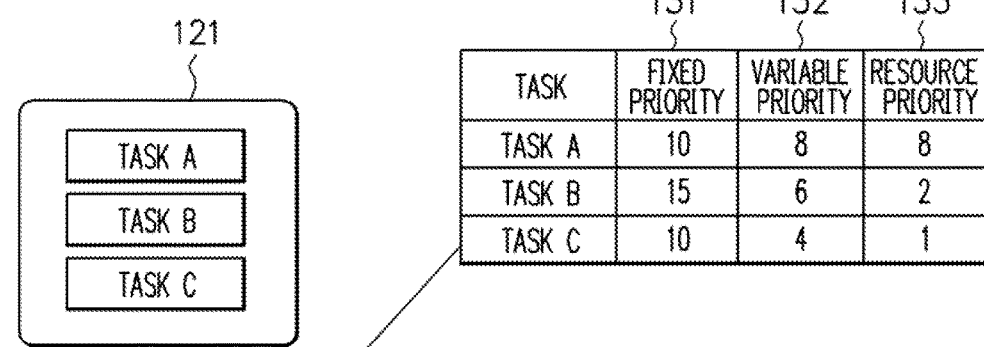
F I G. 1C
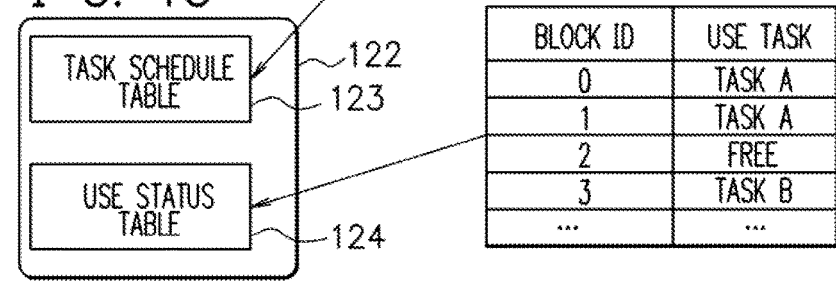

F I G. 9
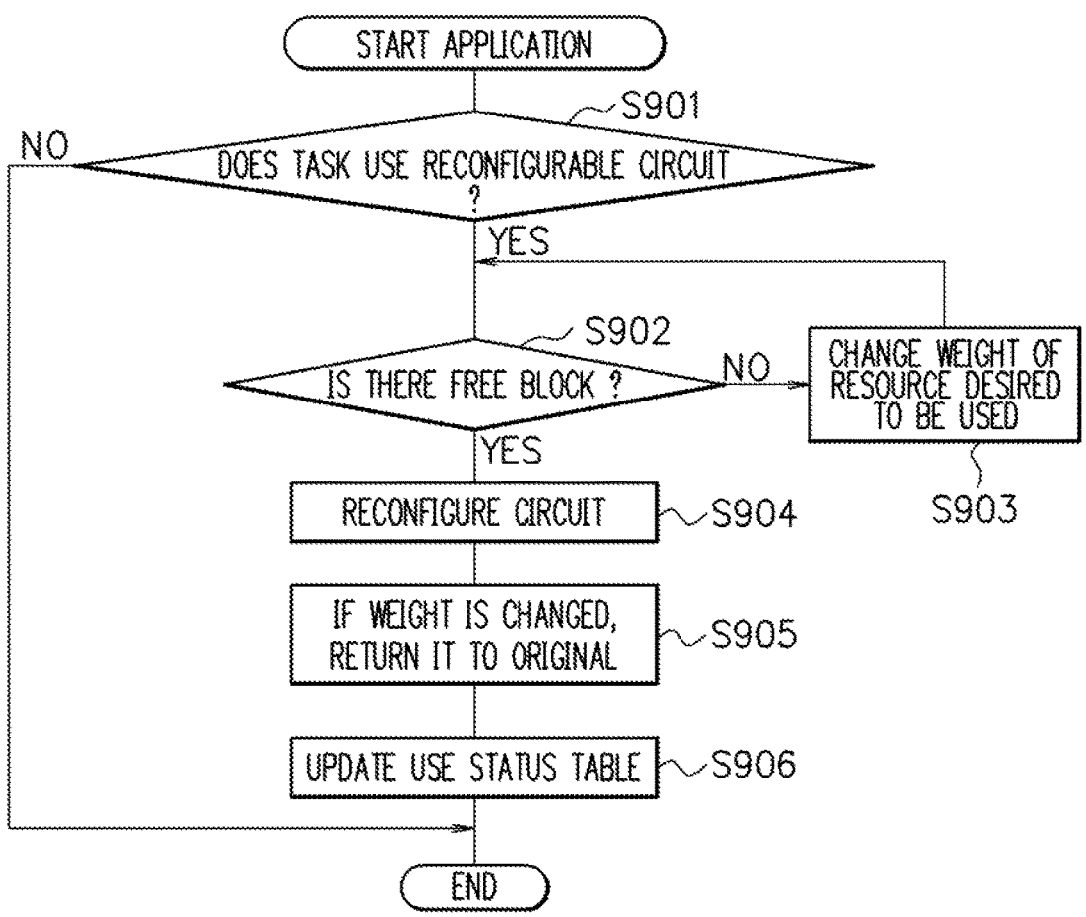

PROCESSOR FOR CHANGING WEIGHT OF COSTS NEEDED IN RECONFIGURABLE CIRCUIT

CROSS-REFERENCE TO RELATED APPLICATION

This application is based upon and claims the benefit of priority of the prior Japanese Patent Application No. 2015-251934, filed on Dec. 24, 2015, the entire contents of which are incorporated herein by reference.

FIELD

The embodiments discussed herein are directed to a processor and a method for controlling a reconfigurable circuit and a program.

BACKGROUND

An information processing device having a reconfiguration device, a configuration code memory, and a reconfiguration device controller has been known (see Patent Document 1). The reconfiguration device changeably achieves a circuit for executing a desired task according to configuration codes. The configuration code memory stores configuration codes for achieving a plurality of circuits each having a different characteristic for every task executed in the reconfiguration device. The reconfiguration device controller controls a load of configuration codes with respect to a reconfiguration device which selects an appropriate circuit to be executed by the reconfiguration device according to the operating state of the system from among the plurality of circuits each having a different characteristic.

Further, a data processing device having a reconfigurable processing device, a monitoring means, and a reconfiguration means has been known (see Patent Document 2). In the reconfigurable processing device, a plurality of data processing units to which data are inputted separately from each other so as to perform data processing are provided by reconfiguration of logic specifications. The monitoring means monitors for a finish of data processing in the data processing units. Based on a monitoring result from the monitoring means, the reconfiguration means does not reconfigure logic specifications of a data processing unit which is processing data but reconfigures logic specifications of one or more data processing units which finished processing, so as to provide one or more new data processing units which are to perform the next data processing.

Patent Document 1: Japanese Laid-open Patent Publication No. 2007-179358
Patent Document 2: Japanese Laid-open Patent Publication No. 2009-129163

When there is not a sufficient space area in the reconfigurable circuit, a new circuit cannot be reconfigured in the reconfigurable circuit. In this case, it is possible that the next processing is forced to wait until the sufficient space area becomes available, resulting in decrease of the efficiency of using the reconfigurable circuit.

SUMMARY

A processor controls a reconfigurable circuit capable of dynamically reconfiguring a circuit which achieves a task of a computer, the processor executes a process having determining, when reconfiguring each of circuits which achieve a plurality of tasks in the reconfigurable circuit, assigned times of time sharing of the plurality of tasks or priority processing ranks of the plurality of tasks based on costs needed in the reconfigurable circuit for respective circuits which achieve the plurality of tasks.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A to 1C are diagrams illustrating configuration examples of processing devices according to a first embodiment;
FIG. 9 is a flowchart illustrating processing of a processor according to a fourth embodiment.

DESCRIPTION OF EMBODIMENTS

First Embodiment

Figure 2A:
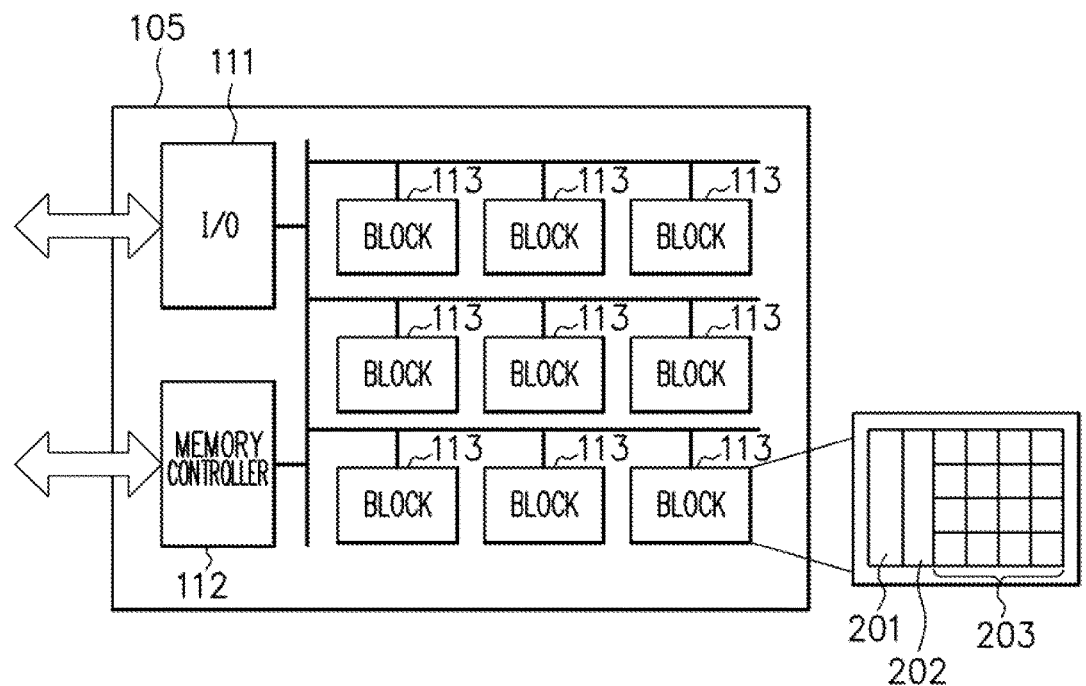
FIG. 2A is a diagram illustrating a configuration example of a reconfigurable circuit.

FIG. 1A is a diagram illustrating a configuration example of a processing device 100 according to a first embodiment. The processing device 100 is, for example, a server device and has a processor 101, an input and output (I/O) bridge circuit 102, a memory interface circuit 103, a main memory 104, and a reconfigurable circuit 105. The reconfigurable circuit 105 has an input and output interface circuit 111, a memory controller 112, and a plurality of blocks 113 which are capable of dynamically reconfiguring a circuit.

The main memory 104 is, for example, an SDRAM (Synchronous Dynamic Random Access Memory) of the DDR (Double-Data-Rate) standard. The main memory 104 stores programs and data, and is connected to the processor 101 and a memory controller 112 via the memory interface 103. The input and output interface circuit 111 is, for example, a PCIe circuit. The processor 101 is connected to the input and output interface circuit 111 via the input and output bridge circuit 102.

The processor 101 is, for example, a computer such as a central processing unit (CPU), and executes a program in the main memory 104 so as to perform a task. The input and output bridge circuit 102 controls a connection between the processor 101 and the reconfigurable circuit 105. The reconfigurable circuit 105 is, for example, an FPGA (field-programmable gate array), and is capable of dynamically configuring circuits which achieve a task of the processor 101. Note that the reconfigurable circuit 105 may be a reconfigurable circuit other than the FPGA. The processor 101 uses circuits in the reconfigurable circuit 105 as an accelerator to accelerate processing speed of the task. The circuits in the reconfigurable circuit 105 are hardware, and thus are able to perform high-speed processing as compared to the program processing by the processor 101.

The main memory 104 stores an application 121 of FIG. 1B and an operating system (OS)/driver 122 of FIG. 1C. The application 121 and the OS/driver 122 are programs executed by the processor 101. The processor 101 reads and executes the OS/driver 122 and the application 121 from the main memory 104. Specifically, the processor 101 executes the application 121 to thereby reconfigure, for example, circuits which achieve a task A, a task B and a task C in respective blocks 113 in the reconfigurable circuit 105. Further, the processor 101 executes an OS/driver 122 to thereby manage a task schedule table 123 and a use status table 124.

The use status table 124 describes the correspondence between a block ID and a use task. The block ID is the identification number of each of the plurality of blocks 113 in the reconfigurable circuit 105. The use task indicates the task that uses the block 113 indicated by each block ID. For example, the blocks 113 with block IDs of "0" and "1" are used by the task A. Further, the block 113 with a block ID of "2" is free, and is not used by any of the tasks. Further, the block 113 with a block ID of "3" is used by the task B.

The task schedule table 123 describes the relationship of a task, a fixed priority 131, a variable priority 132, and a resource priority 133. For example, a task A has the fixed priority 131 of "10", the variable priority 132 of "8", and the resource priority 133 of "8". A task B has the fixed priority 131 of "15", the variable priority 132 of "6", and the resource priority 133 of "2". A task C has the fixed priority 131 of "10", the variable priority 132 of "4", and the resource priority 133 of "1" The processor 101 refers to the use status table 124 to determine the resource priority 133 of the task schedule table 123 according to the number of blocks 113 used by each task.

For example, when the processor 101 uses eight blocks 113 for reconfiguring a circuit which achieves the task A in the reconfigurable circuit 105, the processor 101 sets the resource priority 133 of the task A of the task schedule table 123 to "8". Further, when the processor 101 uses two blocks 113 for reconfiguring a circuit which achieves the task B in the reconfigurable circuit 105, the processor 101 sets the resource priority 133 of the task B of the task schedule table 123 to "2". Further, when the processor 101 uses one block 113 for reconfiguring a circuit which achieves the task C in the reconfigurable circuit 105, the processor 101 sets the resource priority 133 of the task C of the task schedule table 123 to "1".

Figure 2B:
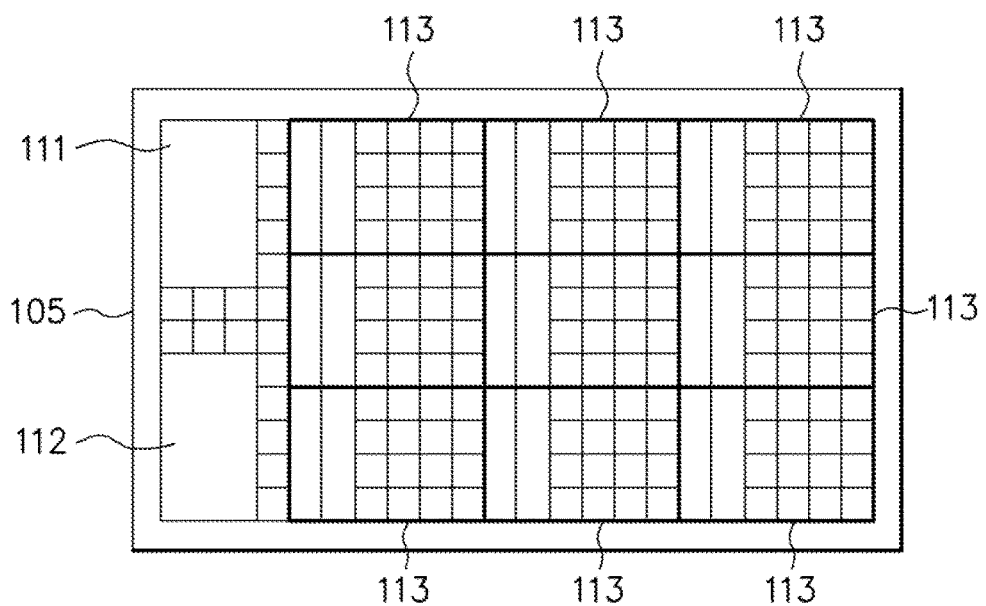
FIG. 2B is a diagram illustrating a layout example of the reconfigurable circuit.

FIG. 2A is a diagram illustrating a configuration example of the reconfigurable circuit 105, and FIG. 2B is a diagram illustrating a layout example of the reconfigurable circuit 105. The input and output interface circuit 111 is connected to a plurality of blocks 113, and inputs or outputs an instruction and the like according to each task. The memory controller 112 is connected to a plurality of blocks 113, and inputs or outputs data to or from the main memory 104. In each of the plurality of blocks 113, a circuit according to the task can be reconfigured, and for example, a memory 201, a digital signal processor (DSP) 202, and a logic circuit 203 can be reconfigured.

Figure 3:
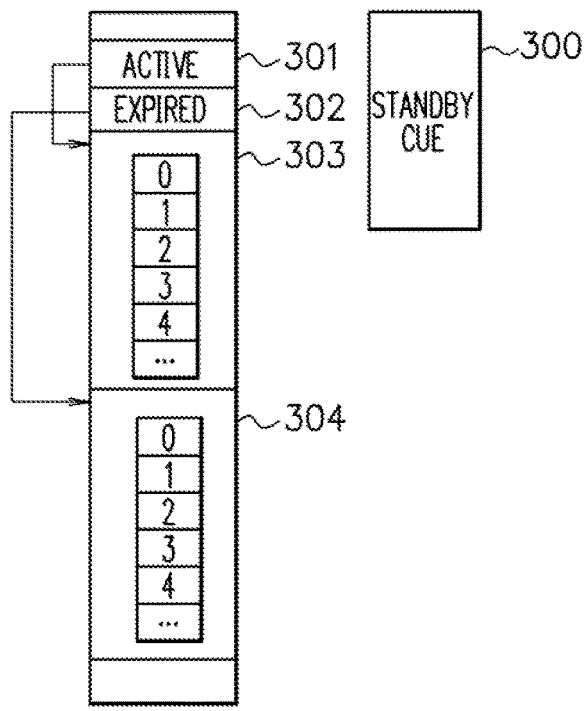
FIG. 3 is a diagram illustrating a configuration example of part of a main memory.

FIG. 3 is a diagram illustrating a configuration example of part of the main memory 104. The main memory 104 stores an active pointer 301, an expiration pointer 302, an active cue 303, an expiration cue 304, and a standby cue 300. The active pointer 301 indicates the first address of the active cue 303. The expiration pointer 302 indicates the first address of the expiration cue 304. The processor 101 refers to the active pointer 301 so as to access the active cue 303, and refers to the expiration pointer 302 so as to access the expiration cue 304.

Hereinafter, processing of the OS/driver 122 executed by the processor 101 will be explained. The processor 101 executes the application 121 so as to store a plurality of tasks in the standby cue 300. Then, when there are sufficient free blocks 113 in the reconfigurable circuit 105, the processor 101 reconfigures circuits which achieve the tasks in the standby cue 300 in blocks 113 in the reconfigurable circuit 105, and moves reconfigured tasks thereof in the standby cue 300 to the active cue 303. Next, the processor 101 performs, for the plurality of tasks in the active cue 303, time sharing processing in the order of priority processing ranks according to the total values of the fixed priority 131, the variable priority 132, and the resource priority 133 and with assigned times according to the total values of the fixed priority 131 and the resource priority 133. The fixed priority 131 is a fixed value specified to each task. The variable priority 132 is a variable value which becomes larger as a standby time of each task becomes longer. The processor 101 instructs a start of operation of the circuit of blocks 113 which achieves a task according to the priority processing ranks, which are in descending order of total values of the fixed priority 131, the variable priority 132, and the resource priority 133 among the plurality of tasks of the task schedule table 123 of FIG. 1C.

For example, in the case of the task schedule table 123 of FIG. 1C, the priority processing ranks are such that the task A is in the first rank, the task B the second rank, and the task C the third rank. Regarding the assigned times, the task A is longest, the task B is second longest, and the task C is third longest.

First, the processor 101 allows the circuit of the blocks 113 for the task A whose priority processing rank is the first rank to operate for an assigned time of the task A. When this operation finishes, the processor 101 moves the task A in the active cue 303 to the expiration cue 304. Next, the processor 101 allows the circuit of the blocks 113 for the task B whose priority processing rank is the second rank to operate for an assigned time of the task B. When this operation finishes, the processor 101 moves the task B in the active cue 303 to the expiration cue 304. Next, the processor 101 allows the circuit of the block 113 for the task C whose priority processing rank is the third rank to operate for an assigned time of the task C. When this operation finishes, the processor 101 moves the task C in the active cue 303 to the expiration cue 304.

Next, when the active cue 303 becomes empty, the processor 101 moves all of the task A, the task B and the task C in the expiration cue 304 to the active cue 303. Thereafter, similarly to the above, the processor 101 allows the circuit of the block 113 for the task A whose priority processing rank is the first rank to operate for an assigned time of the task A. When this operation finishes, the processor 101 moves the task A in the active cue 303 to the expiration cue 304. Next, the processor 101 allows the circuit of the block 113 for the task B whose priority processing rank is the second rank to operate for an assigned time of the task B. When this operation finishes, the processor 101 moves the task B in the active cue 303 to the expiration cue 304. Next, the processor 101 allows the circuit of the block 113 for the task C whose priority processing rank is the third rank to operate for an assigned time of the task C. When this operation finishes, the processor 101 moves the task C in the active cue 303 to the expiration cue 304. By repeating the above processing, the processor 101 performs time sharing processing of the plurality of tasks, the task A, the task B, and the task C. When processing of each task is completed, this task is deleted from the active cue 303 and the expiration cue 304.

The resource priority 133 becomes larger as the number of blocks 113 used by each task becomes larger. That is, the resource priority 133 becomes larger as the total area of the blocks 113 used by each task becomes larger. The priority processing rank of each task is given higher priority as the resource priority 133 of each task is larger. The assigned time of each task becomes longer as the resource priority 133 of each task becomes larger. Therefore, among the plurality of tasks, the larger the number of blocks 113 used by a task, or the larger the total area of blocks 113 used by a task, the earlier the operation of the blocks 113 used by this task can be finished, allowing the used blocks 113 with a large area to be a free state. Thus, the standby time for the next task can be shortened, and the efficiency of using the reconfigurable circuit 105 can be improved.

Figure 4:
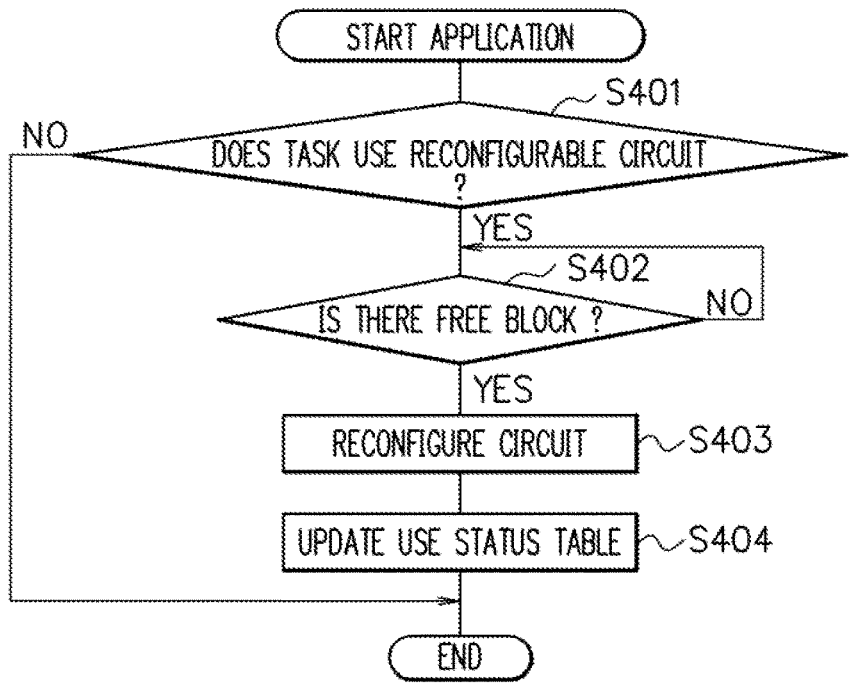
FIG. 4 is a flowchart illustrating a starting process of an application executed by a processor.

FIG. 4 is a flowchart illustrating a starting process of the application 121 executed by the processor 101. A method for controlling the reconfigurable circuit 105 will be described below. In step S401, the processor 101 determines whether a task by the application 121 uses the reconfigurable circuit 105 as an accelerator. Then, the processor 101 advances the processing to step S402 when the task uses the reconfigurable circuit 105, or finishes the processing when the task does not use the reconfigurable circuit 105.

In step S402, the processor 101 determines whether there are sufficient free blocks 113 for reconfiguring a circuit which achieves a task in the standby cue 300 in the blocks 113 in the reconfigurable circuit 105. Then, the processor 101 waits until the sufficient free blocks 113 become available, and when the sufficient free blocks 113 become available, the processor 101 advances the processing to step S403.

In step S403, the processor 101 performs control to reconfigure the circuit which achieves the task in the standby cue 300 in the blocks 113 in the reconfigurable circuit 105. Then, the processor 101 moves the task in the standby cue 300 to the active cue 303.

Next, in step S404, the processor 101 updates the use status table 124 of FIG. 1C according to the above-described reconfiguration. Specifically, the processor 101 records the task using the block 113 of each block ID in the use status table 124.

Figure 5:
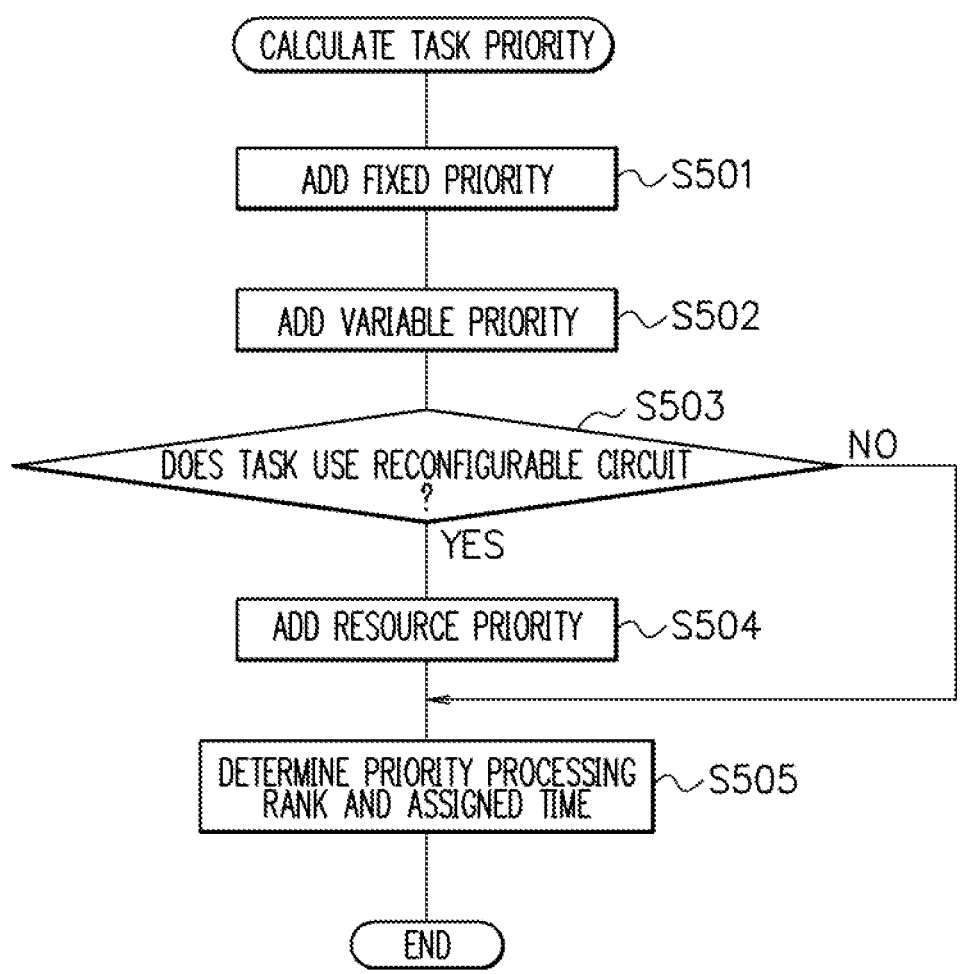
FIG. 5 is a flowchart illustrating calculation processing of task priority used by the processor.

FIG. 5 is a flowchart illustrating calculation processing of task priority used by the processor 101. The initial value of the task priority of each task is 0 (zero). In step S501, the processor 101 records the fixed priority 131 specified to each task in the task schedule table 123, and adds the fixed priority 131 of each task to the task priority of each task.

Next, in step S502, the processor 101 records the variable priority 132 of each task according to the standby time of each task in the task schedule table 123, and adds the variable priority 132 of each task to the task priority of each task.

Next, in step S503, the processor 101 determines whether each task uses the reconfigurable circuit 105 as an accelerator. Then, the processor 101 advances the processing to step S504 when the task uses the reconfigurable circuit 105, or advances the processing to step S505 when the task does not use the reconfigurable circuit 105.

In step S504, the processor 101 records the resource priority 133 of each task in the task schedule table 123 based on the use status table 124, and adds the resource priority 133 of each task to the task priority of each task. For example, the processor 101 refers to the use status table 124 and records the resource priority 133 of each task in the task schedule table 123 according to the number of blocks 113 used by each task. Details of this step S504 will be explained with reference to FIG. 6A later. Thereafter, the processor 101 advances the processing to step S505.

In step S505, the processor 101 determines the priority processing rank of each task according to the task priority of each task by processing of a determination unit. The larger the task priority of each task, the earlier the priority processing rank of this task. Further, the processor 101 determines the assigned time of time sharing of each task according to the total value of the fixed priority 131 and the resource priority 133 of each task by processing of the determination unit. The larger the total value of the fixed priority 131 and the resource priority 133 of each task, the longer the assigned time of time sharing of this task.

Thereafter, the processor 101 performs time sharing processing in the order of the determined priority processing ranks with the determined assigned times on the plurality of tasks in the active cue 303.

Figure 6:
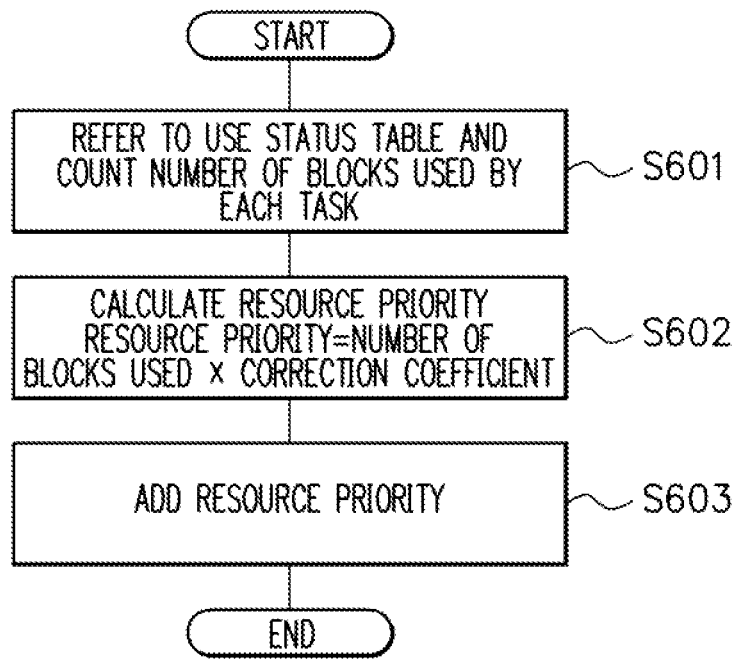
FIG. 6A is a flowchart illustrating details of processing of step S504 of FIG. 5.
FIG. 6B is a diagram illustrating an example of a use status table.

FIG. 6A is a flowchart illustrating details of processing of step S504 of FIG. 5. FIG. 6B is a diagram illustrating an example of a use status table 124 updated by the processor 101 in step S404 of FIG. 4. The use status table 124 describes tasks using blocks 113 with respective block IDs.

In step S601, the processor 101 refers to the use status table 124 and counts the number of blocks 113 used by each task. Next, in step S602, the processor 101 multiplies the aforementioned number of blocks used by each task by a correction coefficient, so as to calculate the resource priority 133 of each task. The correction coefficient is a weighting factor of the resource priority 133 with respect to the fixed priority 131 and the variable priority 132. Next, in step S603, the processor 101 adds the resource priority 133 of each task to the task priority of each task.

Note that the processor 101 may perform the time sharing processing of a plurality of tasks with the assigned time of each task without the above-described priority processing ranks. Further, the processor 101 is not limited to the time sharing processing, and may execute a plurality of tasks in the order of the above-described priority processing ranks without the assigned time of time sharing.

As described above, the processor 101 controls the reconfigurable circuit 105 capable of dynamically reconfiguring a circuit which achieves a task of the processor 101. Further, when reconfiguring each of circuits which achieve a plurality of tasks in the reconfigurable circuit 105, the processor 101 determines the assigned times of time sharing of the plurality of tasks or the priority processing ranks of the plurality of tasks based on costs needed in the reconfigurable circuit 105 for respective circuits which achieve the plurality of tasks. The aforementioned costs needed in the reconfigurable circuit 105 are the used area of blocks 113 in the reconfigurable circuit 105 for respective circuits which achieve the plurality of tasks, or the number of blocks 113 used in the reconfigurable circuit 105 for respective circuits which achieve the plurality of tasks. According to this embodiment, operation of any high-cost circuit can be finished early. Thus, the standby time for the next task can be reduced, and the efficiency of using the reconfigurable circuit 105 can be improved.

Second Embodiment

Figure 7:
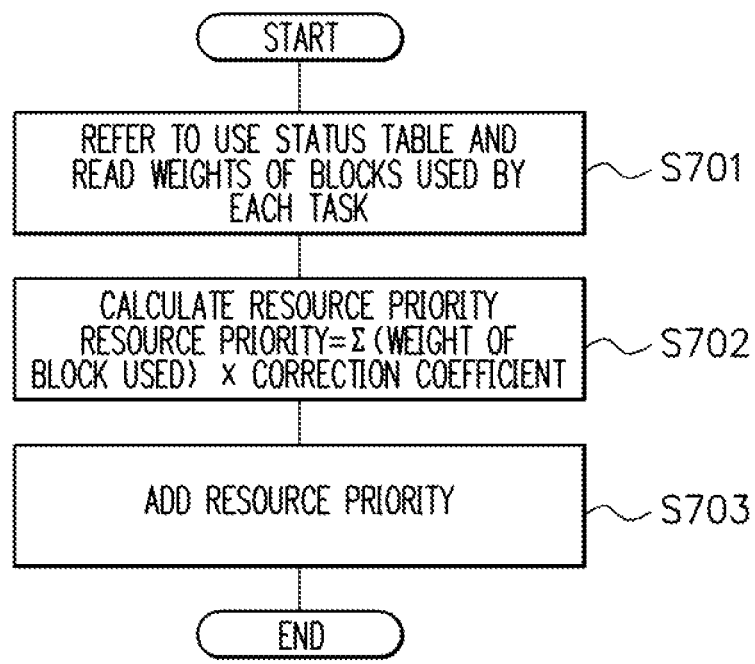
FIG. 7A is a flowchart illustrating processing of a processor according to a second embodiment.
FIG. 7B is a diagram illustrating an example of a use status table.

FIG. 7A is a flowchart illustrating processing of a processor 101 according to a second embodiment, and is a flowchart illustrating details of processing of step S504 of FIG. 5. Differences of the second embodiment from the first embodiment will be explained below. FIG. 7B is a diagram illustrating an example of a use status table 124 updated by the processor 101 in step S404 of FIG. 4. The use status table 124 describes tasks using blocks 113 with respective block IDs and weights of the blocks 113 with respective block IDs. The weight of the block 113 with each block ID is determined according to the position of the block 113 in the reconfigurable circuit 105. For example, the shorter the communication distance to the input and output interface circuit 111, the shorter the communication time of each block 113. Therefore the shorter the communication distance to the input and output interface circuit 111 from each block 113, the larger the weight of this block 113. Further, the weight of each block 113 may be larger as the communication distance from each block 113 to the memory controller 112 is shorter.

In step S701, the processor 101 refers to the use status table 124 and reads the weights of blocks 113 used by each task. Next, in step S702, the processor 101 multiplies the total sum of aforementioned weights of blocks 113 used by each task by a correction coefficient, so as to calculate the resource priority 133 of this task. Next, in step S703, the processor 101 adds the resource priority 133 of each task to the task priority of this task.

As described above, the processor 101 controls the reconfigurable circuit 105 capable of dynamically reconfiguring a circuit which achieves a task of the processor 101. Further, when reconfiguring each of circuits which achieve a plurality of tasks in the reconfigurable circuit 105, the processor 101 determines the assigned times of time sharing of the plurality of tasks or the priority processing ranks of the plurality of tasks based on costs needed in the reconfigurable circuit 105 for respective circuits which achieve the plurality of tasks. The aforementioned costs needed in the reconfigurable circuit 105 are the positions in the reconfigurable circuit 105 of respective circuits which achieve the plurality of tasks. According to this embodiment, operation of any high-cost circuit can be finished early. Thus, the standby time for the next task can be reduced, and the efficiency of using the reconfigurable circuit 105 can be improved.

Third Embodiment

Figure 8:
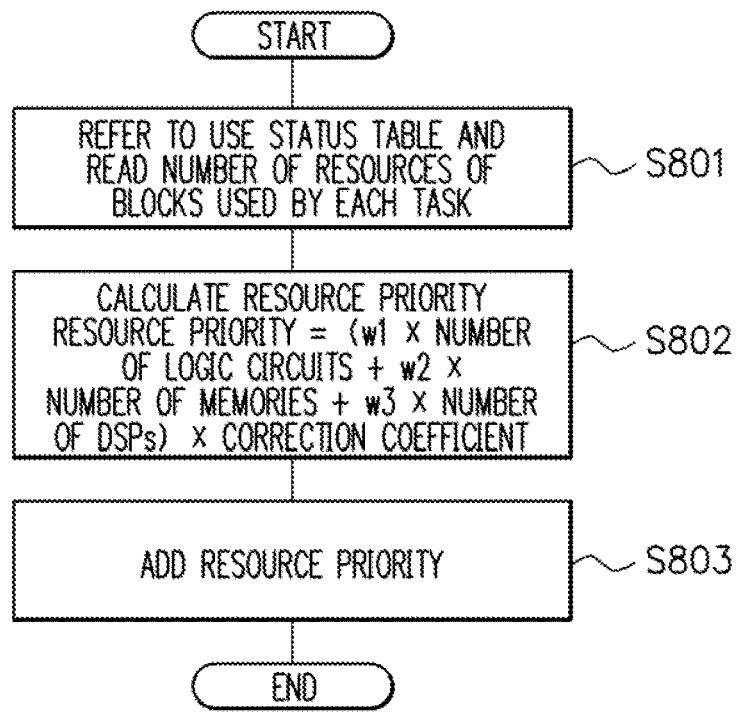
FIG. 8A is a flowchart illustrating processing of a processor according to a third embodiment.
FIG. 8B is a diagram illustrating an example of a use status table.
FIG. 8C is a diagram illustrating weights.

FIG. 8A is a flowchart illustrating processing of a processor 101 according to a third embodiment, and is a flowchart illustrating details of processing of step S504 of FIG. 5. Differences of the third embodiment from the first embodiment will be explained below. As illustrated in FIG. 2A, each block 113 has a memory 201, a DSP 202, and a logic circuit 203 as resources. FIG. 8B is a diagram illustrating an example of a use status table 124 updated by the processor 101 in step S404 of FIG. 4. The use status table 124 describes tasks using blocks 113 with respective block IDs, the numbers of logic circuits 203 in the blocks 113 with respective block IDs, the numbers of memories 201, and the numbers of DSPs 202. The plurality of blocks 113 differ in the number of logic circuits 203, the number of memories 201, and the number of DSPs 202 from each other. The main memory 104 stores, as illustrated in FIG. 8C, the weight w1 of logic circuit 203, the weight w2 of memory 201, and the weight w3 of DSP 202. Thus, in this embodiment, weight is given to the resources which the block 113 possesses, so as to increase the weight of a resource which is desired to stop operating early.

In step S801, the processor 101 refers to the use status table 124 and reads the numbers of resources of the blocks 113 used by each task. Specifically, the processor 101 reads, for every task, the total sum of the numbers of logic circuits 203, the total sum of the numbers of memories 201, and the total sum of the numbers of DSPs 202 of the blocks 113 used by each task. Next, in step S802, for every task, the processor 101 multiplies the aforementioned total sum of the numbers of logic circuits 203 of the blocks 113 used by each task by the weight w1 of logic circuit 203, multiplies the aforementioned total sum of the numbers of memories 201 of the blocks 113 used by each task by the weight w2 of memory 201, and multiplies the aforementioned total sum of the numbers of DSPs 202 of the blocks 113 used by each task by the weight w3 of DSP 202, and then adds up multiplication results thereof. Then, for every task, the processor 101 multiplies the result of addition by a correction coefficient, so as to calculate the resource priority 133 of each task. Next, in step S803, the processor 101 adds the resource priority 133 of each task to the task priority of this task.

As described above, the processor 101 controls the reconfigurable circuit 105 capable of dynamically reconfiguring a circuit which achieves a task of the processor 101. Further, when reconfiguring each of circuits which achieve a plurality of tasks in the reconfigurable circuit 105, the processor 101 determines the assigned times of time sharing of the plurality of tasks or the priority processing ranks of the plurality of tasks based on costs needed in the reconfigurable circuit 105 for respective circuits which achieve the plurality of tasks. The aforementioned costs needed in the reconfigurable circuit 105 are the types of resources used by respective circuits which achieve the plurality of tasks. According to this embodiment, operation of any high-cost circuit can be finished early. Thus, the standby time for the next task can be reduced, and the efficiency of using the reconfigurable circuit 105 can be improved.

Fourth Embodiment

FIG. 9 is a flowchart illustrating processing of a processor 101 according to a fourth embodiment. The flowchart of FIG. 9 is made by adding processing of steps S903 and S905 to the flowchart of FIG. 4. Differences of the fourth embodiment from the second and third embodiments will be explained below. In this embodiment, when there is a task on standby in the standby cue 300 because there are not sufficient free blocks 113 in the reconfigurable circuit 105, the weight is changed dynamically so as to increase the weight of a resource which is desired to be used by the task on standby.

In step S901, the processor 101 determines whether a task by an application 121 uses the reconfigurable circuit 105 as an accelerator. Then, the processor 101 advances the processing to step S902 when the task uses the reconfigurable circuit 105, or finishes the processing when the task does not use the reconfigurable circuit 105.

In step S902, the processor 101 determines whether there are sufficient free blocks 113 for reconfiguring the circuit which achieves a task in the standby cue 300 in blocks 113 in the reconfigurable circuit 105. Then, the processor 101 advances the processing to step S903 when there are not sufficient free blocks 113, or advances the processing to step S904 when there are sufficient free blocks 113.

In step S903, the processor 101 changes the weight of the resource which is desired to be used by the task on standby in the standby cue 300. For example, when the task on standby is a task which uses a memory but there is not a sufficient free space of the memory 201 in the reconfigurable circuit 105, the processor 101 changes the weight w2 of memory of FIG. 8C to increase it. Further, when the task on standby is a task for which the amount of communication in the input and output interface circuit 111 is large, the processor 101 changes the weight of FIG. 7B so as to increase the weight of a block 113 which is close to the input and output interface circuit 111. Further, when the task on standby is a task for which the number of accesses by the memory controller 112 is large, the processor 101 changes the weight of FIG. 7B so as to increase the weight of a block 113 which is close to the memory controller 112. Note that the processor 101 may change the weight of a resource desired to be used by a task on standby in the expiration cue 304.

Thereafter, the processor 101 returns the processing to step S902. As described above, by changing the weight of a resource, processing of a resource which is needed by a task on standby can be finished early, and this resource can become a free state. Thus, the standby time for the task can be reduced.

In step S904, the processor 101 performs control to reconfigure a circuit which achieves a task in the standby cue 300 in the blocks 113 in the reconfigurable circuit 105. Then, the processor 101 moves the task in the standby cue 300 to the active cue 303.

Next, in step S905, the processor 101 returns the weight of the resource changed in step S903 to an original value.

Next, in step S906, the processor 101 updates the use status table 124 according to the aforementioned reconfiguration. Specifically, the processor 101 records the task using the block 113 of each block ID in the use status table 124.

As described above, according to this embodiment, the processor 101 dynamically changes the weight of costs needed in the reconfigurable circuit 105 according to a task on standby. Thus, processing of a resource which is needed by a task on standby can be finished early, and the standby time of this task can be shortened.

This embodiment can be achieved by the processor (computer) 101 executing a program. Further, a computer readable recording medium which records the aforementioned program and a computer program product of the aforementioned program or the like can be applied as an embodiment of the present invention. As the recording medium, for example, a flexible disk, a hard disk, an optical disc, a magnetic-optical disc, a CD-ROM, a magnetic tape, a nonvolatile memory card, a ROM, or the like can be used.

It should be noted that all of the above-described embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

The efficiency of using a reconfigurable circuit can be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor that controls a reconfigurable circuit capable of dynamically reconfiguring a circuit which achieves a task of a computer, the processor executes a process comprising:
    determining, when reconfiguring each of circuits which achieve a plurality of tasks in the reconfigurable circuit, assigned times of time sharing of the plurality of tasks or priority processing ranks of the plurality of tasks based on costs needed in the reconfigurable circuit for respective circuits which achieve the plurality of tasks,
    wherein the processor causes the computer to further execute processing to change a weight of costs needed in the reconfigurable circuit according to a task on standby.

2. A method for controlling a reconfigurable circuit capable of dynamically reconfiguring a circuit which achieves a task of a processor, the method comprising:
    determining by the processor, when reconfiguring each of circuits which achieve a plurality of tasks in the reconfigurable circuit, assigned times of time sharing of the plurality of tasks or priority processing ranks of the plurality of tasks based on costs needed in the reconfigurable circuit for respective circuits which achieve the plurality of tasks, and
    changing by the processor, a weight of costs needed in the reconfigurable circuit according to a task on standby.

3. A computer-readable non-transitory recording medium having stored therein a program for controlling a reconfigurable circuit capable of dynamically reconfiguring a circuit which achieves a task of a processor, the program for causing a computer to execute:
    processing of determining, when reconfiguring each of circuits which achieve a plurality of tasks in the reconfigurable circuit, assigned times of time sharing of the plurality of tasks or priority processing ranks of the plurality of tasks based on costs needed in the reconfigurable circuit for respective circuits which achieve the plurality of tasks, and
    processing of changing, a weight of costs needed in the reconfigurable circuit according to a task on standby.

* * * * *